United States Patent [19]

Hooker et al.

[11] 3,898,627

[45] Aug. 5, 1975

[54] OPTICAL PRINTER HAVING SERIALIZING BUFFER FOR USE WITH VARIABLE LENGTH BINARY WORDS

[75] Inventors: Robert W. Hooker; Robert R. Schomburg, both of Boulder, Colo.

[73] Assignee: International Business Machines Corporation, Armonk, N.Y.

[22] Filed: Mar. 22, 1974

[21] Appl. No.: 454,025

[52] U.S. Cl. .......................... 340/172.5; 340/173 R

[51] Int. Cl. .......................... G11c 19/00

[58] Field of Search .......................... 340/172.5, 173 R

[56] References Cited

UNITED STATES PATENTS

| | | | |
|---|---|---|---|
| 3,293,614 | 12/1966 | Fenimore | 340/172.5 |
| 3,772,658 | 11/1973 | Sarlo | 340/173 R |

*Primary Examiner*—Terrell W. Fears
*Attorney, Agent, or Firm*—Francis A. Sirr

[57] ABSTRACT

An optical printer including a binary, i.e., on/off, spot forming device which traverses an electrophotographic copy drum with a raster pattern to reproduce thereon a latent image of a text, which text is stored in a page memory. All possible text characters are stored in a font memory. The characters which are needed to reproduce a particular page, as stored in page memory, are selectively modified and then presented, as variable length binary character words, to an output serializing buffer. This buffer comprises a plurality (N) of multistage (M) shift registers. A load distributing means is operable to load the first bit of a binary character word in the first stage of one of said registers, the 1+N bit in the second stage of said one register, and so on progressively. The first stage of the shift register whose first stage is next in read-order receives the second bit of the character word, the 2+N bit is placed in its second stage, and so on progressively. This process continues through all registers until the character word is completely loaded. A pointer is generated, to control the loading of the next character word so that continuous cyclic accessing of the first stages of the registers, in a read-order from 1 through N, provides a serial binary bit stream. This bit stream is operable to provide binary control of the spot forming device.

9 Claims, 15 Drawing Figures

| | 3 | 2 | 1 |
|---|---|---|---|
| SR8 | | | BIT 2" |
| SR7 | | | BIT 1" |
| SR6 | | | BIT 8" |
| SR5 | | | BIT 7" |
| SR4 | | | BIT 6" |
| SR3 | | | BIT 5" |
| SR2 | | | BIT 4" |
| SR1 | | | BIT 3" |

160 · WORD X+1 POINTER · 159

FIG. 10

| | | READ CLOCK | CLOCK 1 | CLOCK 2 | CLOCK 3 | CLOCK 4 |
|---|---|---|---|---|---|---|
| | T1 | READ SR5 | WORD X LOAD SR1 & SR2 | | | |
| | T2 | READ SR6 | | | | |
| | T3 | READ SR7 | | WORD X LOAD SR3 & SR4 | | |
| END OF READ WORD X-1 ↑ | T4 | READ SR8 | | | | |
| ↓ BEGINNING OF READ WORD X | T5 | READ SR1 | | | WORD X LOAD SR5 & SR6 | |
| | T6 | READ SR2 | | | | |
| | T7 | READ SR3 | | | | WORD X LOAD SR7 & SR8 |
| | T8 | READ SR4 | | | | |
| | T9 | READ SR5 | SHIFT SR1 & SR2 | | | |
| | T10 | READ SR6 | | | | |
| | T11 | READ SR7 | | SHIFT SR3 & SR4 | | |
| | T12 | READ SR8 | | | | |
| | T13 | READ SR1 | | | SHIFT SR5 & SR6 | |
| | T14 | READ SR2 | | | | |
| | T15 | READ SR3 | | | | SHIFT SR7 & SR8 |
| | T16 | READ SR4 | | | | |
| | T17 | READ SR5 | SHIFT SR1 & SR2 | | | |
| | T18 | READ SR6 | | | | |
| | T19 | READ SR7 | | SHIFT SR3 & SR4 | | |
| | T20 | READ SR8 | | | | |
| | T21 | READ SR1 | | | SHIFT SR5 & SR6 | |
| | T22 | READ SR2 | | | | |
| | T23 | READ SR3 | | | | WORD X+1 LOAD SR7 & SR8 |
| | T24 | READ SR4 | | | | |
| | T25 | READ SR5 | WORD X+1 LOAD SR1 & SR2 | | | |
| END OF READ WORD X ↑ | T26 | READ SR6 | | | | |
| ↓ BEGINNING OF READ WORD X+1 | T27 | READ SR7 | | WORD X+1 LOAD SR3 & SR4 | | |
| | T28 | READ SR8 | | | | |
| | T29 | READ SR1 | | | WORD X+1 LOAD SR5 & SR6 | |
| | T30 | READ SR2 | | | | |

FIG. 11

| | 3rd STAGE | 2nd STAGE | 1st STAGE |
|---|---|---|---|
| SR8 | | | BIT 18 |
| SR7 | | | BIT 17 |
| SR6 | | | BIT 16 |
| SR5 | | | BIT 15 |
| SR4 | | | BIT 14 |
| SR3 | | | BIT 13 |
| SR2 | BIT 18' | BIT 10' | BIT 2' |
| SR1 | BIT 17' | BIT 9' | BIT 1' |

READ ORDER (↑ 1st STAGE)

FIG. 12

| | 3rd STAGE | 2nd STAGE | 1st STAGE |
|---|---|---|---|
| SR8 | | BIT 16' | BIT 8' |
| SR7 | | BIT 15' | BIT 7' |
| SR6 | BIT 22' | BIT 14' | BIT 6' |
| SR5 | BIT 21' | BIT 13' | BIT 5' |
| SR4 | BIT 20' | BIT 12' | BIT 4' |
| SR3 | BIT 19' | BIT 11' | BIT 3' |
| SR2 | BIT 18' | BIT 10' | BIT 2' |
| SR1 | BIT 17' | BIT 9' | BIT 1' |

FIG. 13

| | 3rd STAGE | 2nd STAGE | 1st STAGE |
|---|---|---|---|
| SR8 | BIT 18" | BIT 10" | BIT 2" |
| SR7 | BIT 17" | BIT 9" | BIT 1" |
| SR6 | | | BIT 22' |
| SR5 | | | BIT 21' |
| SR4 | | | BIT 20' |
| SR3 | | | BIT 19' |
| SR2 | | | BIT 18' |
| SR1 | | | BIT 17' |

FIG. 14

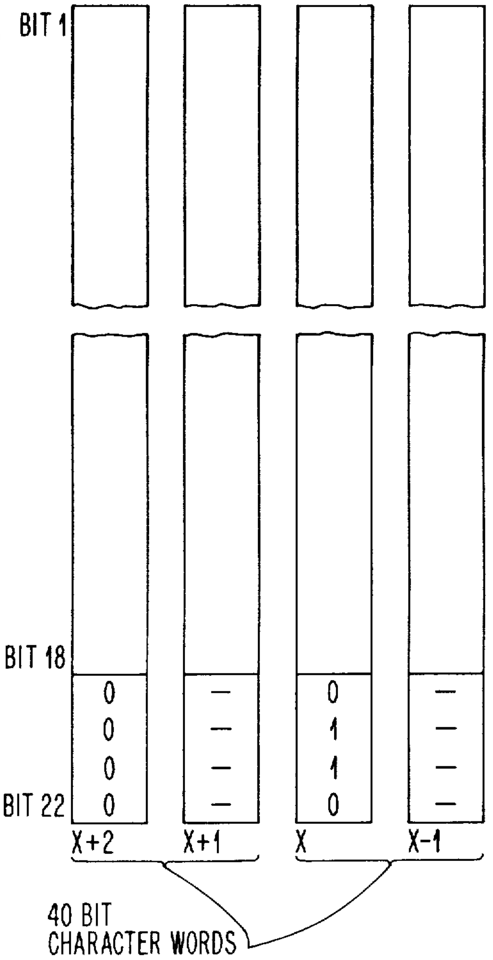

OPTICAL PRINTER HAVING SERIALIZING BUFFER FOR USE WITH VARIABLE LENGTH BINARY WORDS

INCORPORATION OF A COPENDING APPLICATION BY REFERENCE THERETO

The copending application of R. R. Schomburg, Ser. No. 408,980, filed Oct. 23, 1973, and commonly assigned, is incorporated herein by reference.

This copending application describes an optical printer character generator wherein a character generation control register independently stores, for each row of text to be generated, the order position of an alphanumeric character being generated and the remaining number of raster scans required to complete generation of the character. This control register enables the generation of symbols, that are allotted different relative widths, by an optical printer having a modulated light spot that scans the entire length of a page in the direction normal to the writing lines on the page. The control register also enables the text which is assembled in a page memory to be generated in reading lines of text that extend either parallel or normal to the direction of light spot scanning by selecting alternate page memory access sequences. By the use of "white space" indicating control codes in combination with the control register of this copending application, it is possible to materially reduce the size of memory required to store a page of text.

BACKGROUND AND SUMMARY OF THE INVENTION

This invention relates to the field of matrix printers and display devices wherein characters, such as alphanumeric characters, are generated by controlling a spot forming device that traverses a copy area. More particularly, this invention relates to a mechanism for controlling the spot forming device as it traverses a scanning path, in a raster pattern that covers the area of an entire page of text. A preferred application of this invention is in an electrophotographic page printing system wherein pages are generated by a modulated light spot that traverses a fixed axial path on the surface of an electrophotographic copy drum with a modulated spot of light to selectively discharge the background or "white area" of the page being generated, leaving on the photoconductive surface an electrostatic latent image of text symbols that are developed and transferred to form final copy by techniques substantially identical to those currently employed in known xerographic copy machines.

The generation of characters for printing or display by selecting predetermined groups of dots form a set matrix of potential dots is a highly developed art. This technique has been used in various forms for telegraph printers, cathode ray tube computer output terminals, computer line printers and photocomposers, to mention a few examples. As used herein, the term "characters" is meant to include a variety of visual symbols, including but not limited to vectors and alphanumeric symbols.

The techniques and apparatus employed in xerographic copy devices have been proposed for some time for the use in generating original text or pictures directly from electronic signals, rather than from the usual optically projected image. An example of one such arrangement is found in U.S. Pat. No. 2,829,025.

A preferred configuration of a xerographic printer exposes a page image by progressive columnar page segments that extend parallel to the axis of the xerographic copy drum. This arrangement maximizes the printer's page production speed by processing pages in the direction of their shorter dimension or width. Conventional text is read along the short dimension of the page, and this type text will be called a "domestic font". Certain other types of text are normally printed with text lines that read along the long dimension of the page. An example of this type of text is the familiar computer printout sheet. This type text will be called "rotated font".

It is desirable for an optical printer to be able to selectively generate lines of text that extend along either the long or short dimension of the page, principally by the selection of type font binary words that present a character matrix in accordance with the desired character orientation. If, for example, printing is to occur in the "domestic font" with lines of text extending along the short dimension of the page, such printing can be controlled by a first font data bank defining the characters in terms of columnar raster strokes. To produce writing lines extending along the long dimension of the page, a "rotated font" data bank is provided which defines patterns for raster strokes extending along the writing line of the page. In printing either font, the paper is fed to the printing machine in an identical manner, the only difference being the electronic control that places the image on the xerographic drum.

The present invention provides improved mechanism for controlling the conversion of variable length, parallel character identifying binary data words into a serial binary bit stream which defines the light/dark contrast pattern required for generating printed pages in the preferred configuration of a xerographic page printer.

More specifically, the font memory contains, for example, a large number of constant-length, 18-bit, binary words which are selectively accessed in accordance with the character content of the page memory. The constant length words are then selectively modified, by adding bits thereto, in accordance with the font desired, and in accordance with the number of desired lines per inch in the output print copy. The result is a variable length font memory word. In an alternative, the words stored in font memory may be of variable length, to both define the character and the font characteristics.

This variable length word is manipulated and controlled in a unique fashion so that it and succeeding words are read in serial fashion so as to sequential control spot control binary modulator for each bit thereof.

In particular, a plurality N of shift registers, each having a plurality M of bit storage stages, are provided, such that, in response to shift control signals, the bits stored therein can be shifted by stages toward a first stage of each register.

The registers are loaded with the above-described variable length font memory words so that the first bit of word X is stored in the first stage of a selected one of the shift registers, the 1+N bit of word X is stored in the second stage of this shift register, and so on progressively. The adjacent shift register, in the readout order, receives the second bit of word X, whereas its second stage receives the 2+N bit, and so on progressively. This loading process continues until work X is completely loaded.

The first bit of word X+1 must be read out in time sequence adjacency to the last bit of word X. In order to determine the proper register location into which the first bit of word X+1 must be loaded, it is necessary to determine the bit-length of word X, as this length relates to the quantity N. Once this has been determined, this length relationship is compared to the numerical identification of the shift register into which the first bit of word X was loaded. These two relationships, namely the bit-length of word X and the shift register pointer for the first bit of word X, are used to machine-calculate the shift register into which the first bit of word X+1 is to be loaded, i.e. the shift register pointer for word X+1.

More specifically, in order to determine the proper register location into which the first bit of word X+1 must be loaded, the bit length of word X is divided by the quantity N (the number of shift registers), in order to determine the remainder of such division. This remainder is added to the numerical identification of the shift register into which the first bit of word X was loaded. This sum constitutes a pointer which identifies and controls the register into which the first bit, the 1+N bit, etc., of data word X+1 will be loaded. In addition, the quotient of the above-mentioned division provides a measure of the number of shift cycles prior to a load cycle for word X+1.

For the case in which the summation of the remainder and the shift register pointer for word X is greater than N, a second division by N is performed. In this case, the remainder which results from this second division is the pointer for word X+1, and the number of shift cycles prior to a load cycle for word X+1 is increased by the quantity one.

In this unique manner, the above-described variable length parallel binary words are presented as a continuous serial bit stream to the spot forming device.

The term shift registers as used herein is meant to generically encompass equivalent structures such as an N-times-M matrix of readable and writable memory locations, whose specific memory locations 1 through N are addressed in a recycling clocked sequence, and whose location data is loaded and shifted under the control of a load/shift clock, this clock being sensitive to the variable length of the parallel data words which are serially read from said specific memory locations.

The foregoing and other features and advantages of the invention will become apparent from the following more particular description of a preferred embodiment of the invention, as illustrated in the accompanying drawing.

BRIEF DESCRIPTION OF THE DRAWING

FIG. 10 is a table which depicts the clocking operation of the shift registers shown in FIG. 5.

FIG. 11 is a diagrammatic showing of the shift registers at the end of time period T2 (FIGS. 9 and 10), showing the data content of the shift registers after bit 16 of word X−1 has been read from shift register SR6, and after all three stages of SR1 and SR2 have been loaded with the appropriate bits of the next word X;

FIG. 12 is a diagrammatic showing of the shift registers at the end of time period T8, showing the data content after bit 4' of word X has been read from shift register SR4, and after the loading of the 22-bit word X has been completed;

FIG. 13 is a diagrammatic showing of the shift registers at the end of time period T24, showing the data content after shift registers SR1 through SR6 have been shifted twice from the stage shown in FIG. 12, whereas shift registers SR7 and SR8 have been shifted once and then loaded with the appropriate double-prime bits of data word X+1. At the end of time period T24, the reading of bit 20', shift register SR4, has been completed;

FIG. 14 depicts two 40-bit font memory words which are successively loaded into the shift registers of FIG. 5 as 18-bit word X−1, 22-bit word X, 18-bit word X+1, and 22-bit word X+2.

DESCRIPTION OF THE PREFERRED EMBODIMENT

Figures 1, 7:
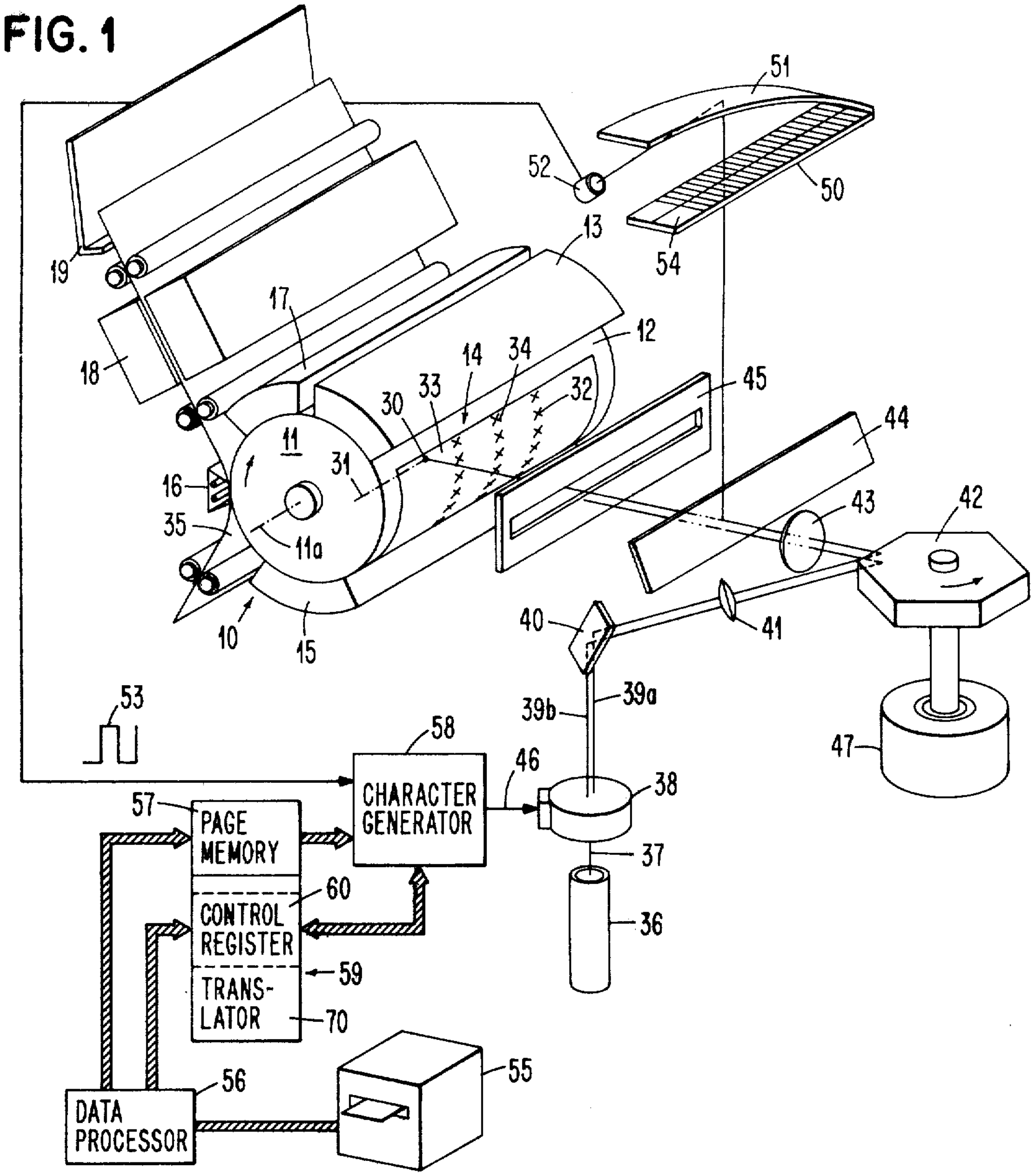
FIG. 1 is a diagrammatic view showing the organization of an optical printer having a character generator constructed in accordance with the teachings of the above-mentioned copending application, and also having a serializing buffer constructed in accordance with the present invention.
FIG. 7 is a diagrammatic showing of the shift registers, and specifically the word X+1 bit content of the first stages thereof, as loaded under the direction of FIG. 5's load director.
Figure 2:
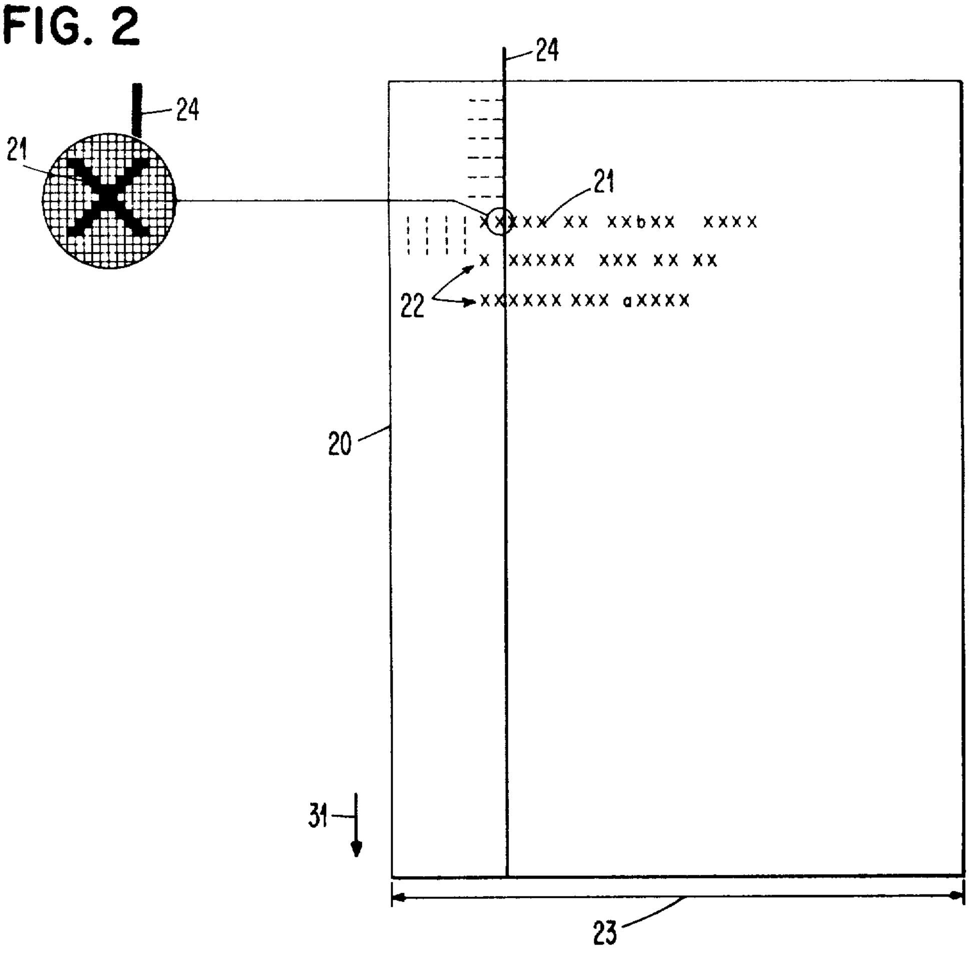
FIG. 2 is a plan view of a typical domestic font page having text printed by a printer like that of FIG. 1.

FIG. 1 shows a xerographic page printer 10 together with a block diagram showing of the image generation control components employed in conjunction therewith. FIG. 2 illustrates a page 20, in domestic font, as created by printer 10. Page 20 bears symbols 21 arranged in lines 22 of text that read along the short page dimension 23.

Returning to FIG. 1, page printer 10 includes a xerographic copy drum 11 providing an image receiving photoconductive surface member 12. Surface 12 is rotated successively past a charging station 13, an exposure station 14, a development station 15, a transfer station 16 and a cleaning station 17. At the exposure station, the uniform electrical charge which was applied to surface 12 at charging station 13 is selectively dissipated by a binary, i.e., on/off, light spot 30 that traverses path 31 extending parallel to the drum axis of rotation 11a. Selective exposure by spot 30 generates binary elements of an electrostatic latent image 32 consisting of discharged white or background area 33 and charged image areas 34. Latent image 32 is presented to development station 15 where colored thermoplastic resin powder or toner is selectively deposited on image areas 34. The thus developed image is transferred to a support sheet 35 by electrostatic force, at station 16. Printed sheet 35 is passed through fixing station 18 where heat or other suitable means temporarily liquifies the resin toner, causing it to adhere to the sheet and to form a permanent image. Sheet 35 is then delivered to an exit pocket or tray 19 where it can be removed. Any toner powder remaining on surface 12, as it leaves transfer station 16, is cleaned at station 17 prior to the recharging of surface 12 for further operation.

Details of a xerographic printer are well known to those skilled in the art and form no part of this invention. It is to be understood that a variety of techniques exists for performing the various functions identified.

Controlled light spot 30 is preferably generated from a source of high energy coherent light, such as a continuous mode laser 36 that projects laser beam 37 along an optical path through binary spot control light modulator 38, redirecting mirror 40, lens 41 scan mirror 42, lens 43, beam splitting partial mirror 44, and knife edge 45 to surface 12. Modulator 38 is an accousto-optic Bragg effect device known to those skilled in the art. Modulator 38 responds to the binary state (1 or 0) of the electrical information bit on its input line 46 to thereby emit beam 37 in either of two closely adjacent but slightly different output paths 39*a* or 39*b*. If beam 37 is emitted along output path 39*a*, it will ultimately be directed past knife edge 45 and strike photoconductive surface 12 a spot 30 to discharge the surface and thereby ultimately cause white background area or a white dot to be produced on sheet 35. Light emitted along path 39*b* is intercepted by knife edge 45 and thus does not strike surface 12. The resulting undischarged surface 12 will develop a toned image dot at station 15 to form part of the image area on sheet 35.

Scan mirror 42 receives laser beam 37 along both paths 39*a* and 39*b* and directs it along scanning path 31, whereby the laser beam generates a columnar segment 24 (see FIG. 2) of the image of page 20. Mirror 42 is configured as a regular polygon and is driven by motor 47 at a substantially constant speed that is chosen with regard to the rotational speed of drum 11 and the size of spot 30, such that individual scanning strokes of spot 30 traverse immediately adjacent areas on surface 12 to provide a full page exposing raster.

Beam splitting mirror 44 intercepts a fraction of laser beam 37 along both paths 39*a* and 39*b*, as the beam is moved through its scanning motion by mirror 42, and diverts this fraction through optical grating 50 to elliptical mirror 51 by which the light is reflected to photodetector 52 positioned at one foci of mirror 51. Scan mirror 42 is located at the other foci of mirror 51, and the optical geometry of the system is selected such that grating 50 is positioned to be equivalently located relative to exposure station 14. Photodetector 52 thus creates a train of clocking pulses 53, i.e., a read-clock, that is a direct measure of the scanning movement of laser beam 37 relative to photoconductor surface 12. Conveniently, the pulses produced at photodetector 52 occur at the same rate that image elements or dots are to be defined by modulator 38, thereby enabling photodetector 52 to directly generate a gating or read clock signal for control of modulator 38. A continuous transparent portion 54 of the grating 50 is provided to enable detection of the completion of each raster scan.

By way of example, the dot density of a scan along path 31, to thereby generate columnar segment 24, may be 240 dots per inch, thereby requiring a grating 50 having 120 opaque lines per inch. The orthogonal dot density, measured along direction 23, FIG. 2, may also be 240 dots per inch.

A source of page text data, such as derived, for example, from a magnetic card or tape reading device 55, delivers the page text data to be printed to data processing apparatus 56. In this manner, the text data is assembled and stored in page memory 57. Each character or symbol to be printed, as well as the spaces to be inserted between characters, are stored in page memory 57 at individual memory addresses which are, in turn, associated with the writing lines of the page and with the other position of the character within the writing line. For example, referring to FIG. 2, a multi-bit data word defining character *b* would be stored in page memory 57 at an address that is identified with the eighth writing line (seven blank lines provide a top margin) and the seventeenth character position (the left margin is composed of five blank characters in this example).

Once the text has been assembled in page memory 57, character generator 58 operates to provide the necessary binary dot pattern control of modulator 38 in order to reproduce the page text. In addition to page memory 57, both data processor 56 and the character generator 58 have access to an additional memory 59. This additional memory includes a page memory address control register 60 and a reference address and escapement value table or translator 70.

Figure 4:
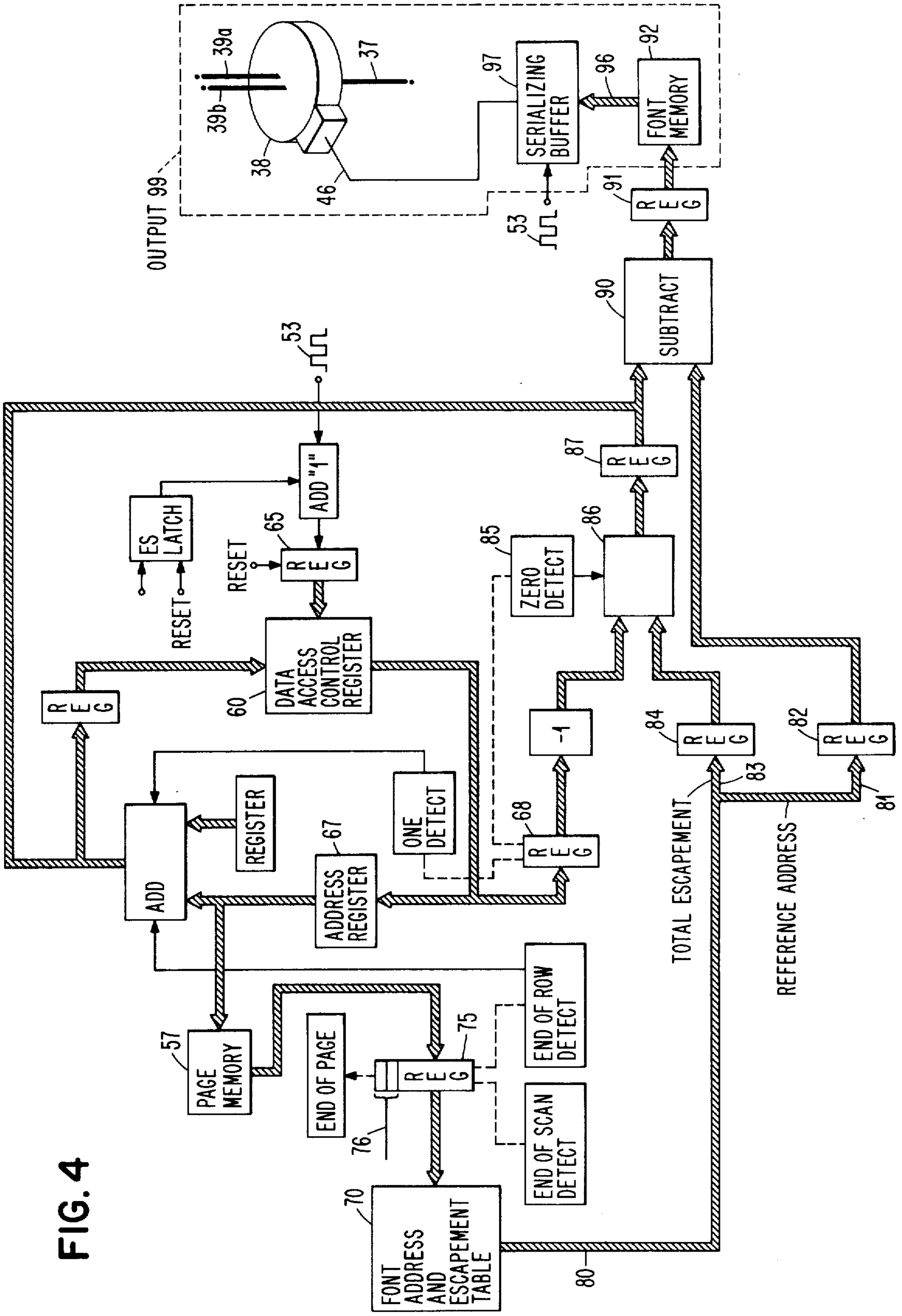
FIG. 4 is a component and data flow diagram showing the major features of the apparatus of FIG. 1.

Page memory address control register 60 is shown diagrammatically in FIG. 4. This register is preferably a dedicated portion of read-write memory 59 (FIG. 1) and includes a plurality of individually addressable multi-bit memory cells, each of which is capable of storing a data word which is divided into a page memory address portion and an escapement control portion. The addresses of these memory cells are sequentially accessed, by a page memory address control row counting register 65 (FIG. 4), to facilitate their access in synchronism with row scanning by light spot 30. When addressed, register 60 delivers a data word along a divided data path, placing the address portion thereof in page memory address register 67 and placing the escapement control portion thereof in running escapement register 68.

Translator 70 is a read only storage memory containing a series of individually addressable multi-bit data words, each of which is uniquely addressable by a character identifying code from page memory 57. Each of these data words contains a first portion which is a reference address to font memory 92 and a second portion which indicates the total number of columnar segments 24 (FIG. 2) that are required to completely generate the character.

The data words contained in translator 70 are individually addressable by address register 75, from page memory 57. Address register 75 includes one or more status bits 76 which are preset to select a particular font or printing mode, for example, the fonts represented by Tables A, B and C, to be discussed later. If font memory 92 is to provide these three different fonts, selection of the type to be employed is made by the data output from font address and escapement table memory device 70, as determined by status bits 76.

Output path 80, from translator 70, is divided into two components, namely, a reference address path 81 connected to register 82, and a total escapement value path 83 connected to total escapement register 84. When the value in running escapement register 68 is "zero", detection circuit 85 gates data path 86 to pass the content of register 84 to remaining escapement register 87, where it is applied along with the content of register 82 to font memory addressing substraction logic 90. This operation produces a specific font memory address in address register 91. If the data in running escapement register 68 is not detected to be "zero", by circuit 85, then data path 86 passes the data in register 68, and not the data in register 84, to register 87.

Each font memory binary data word accessed by an address applied to address register 91 defines the light/dark contrast pattern necessary to generate the small portion of columnar segment 24 associated with a character such as 21 in FIG. 2. The generation of each symbol requires a plurality of column segments 24. Therefore, a like plurality of data words is provided in font memory 92, thus forming an entire group of data bits which define the contrast pattern for the related character, as correlated with an appropriate raster pattern. Conveniently, the addresses of adjacent data words correspond to adjacent character columnar segments 24, and thus differ by the constant "one". It will be recognized by those skilled in the art that various compression coding techniques could be employed instead of an individual binary bit for each light/dark dot.

The binary word accessed from font memory 92, as addressed by register 91, is delivered on output lines 96 to output control serializing buffer 97. The individual bits of the binary word loaded into output buffer 97 are gated to modulator 38 by read clock pulses 53.

Figure 5:
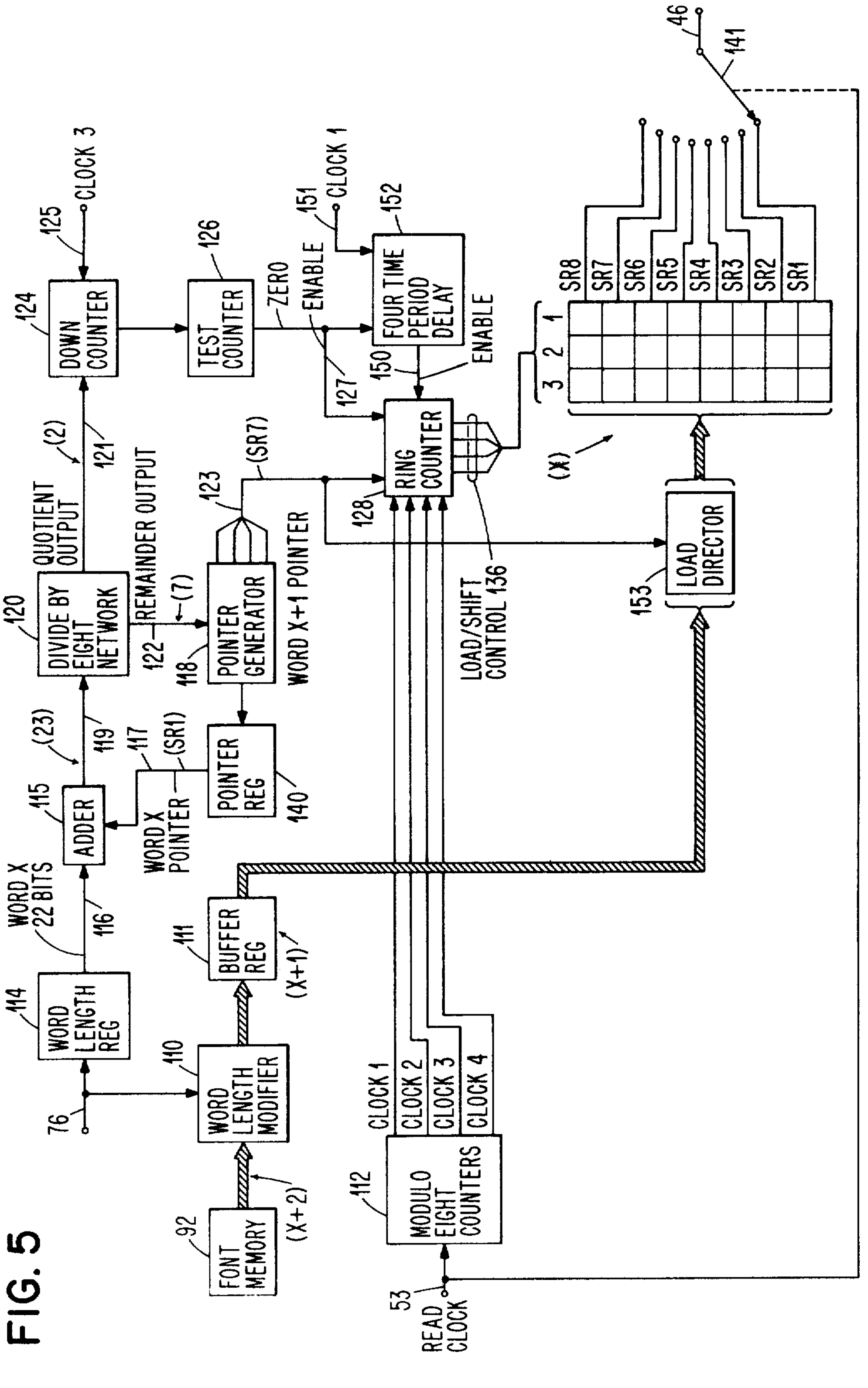
FIG. 5 is a component and data flow diagram of the output portion of the apparatus of FIG. 4.

The broken line portion 99 of FIG. 4 identifies the output portion thereof, and is shown in greater detail in FIG. 5.

The present invention, and its unique means of buffering variable length binary words for serial readout without discontinuity between the last bit of one word and the first bit of the next word, is described with reference to three different fonts. This example is not to be considered as a limitation upon the present invention, but rather, it is but one example of a situation which demonstrates the utility of the present invention.

Figure 3:
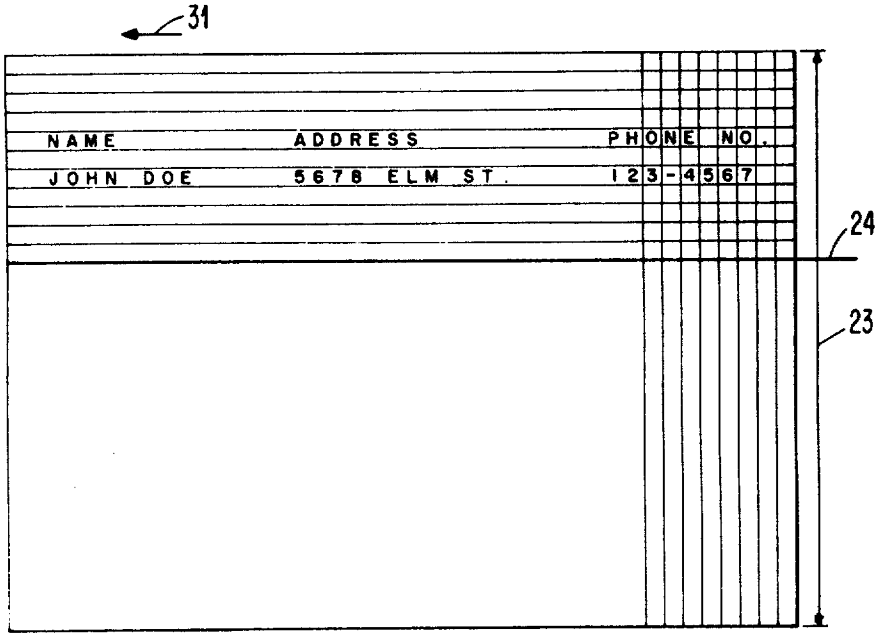
FIG. 3 is a plan view of a typical rotated font page having text printed by a printer like that of FIG. 1.

The three chosen fonts are domestic font, six lines per inch; domestic font, five and one-third lines per inch; and rotated font. The two domestic fonts include the capability of character underscore. Domestic font is shown in FIG. 2. Rotated font is shown in FIG. 3.

The variable length binary words which serially control modulator 38 (FIG. 1) for these three exemplary fonts are depicted in Tables A, B and C.

TABLE A

| 2nd Word | 1st Word |
|---|---|
| Bit 1 | Bit 1 |
| Bit 2 | Bit 2 |
| . | . |
| . | . |
| Bit 17 | Bit 17 |
| Bit 18 | Bit 18 |
| 0 | Not used |

TABLE A-Continued

| 2nd Word | 1st Word |
|---|---|
| 1 | Not used |
| 1 | Not used |
| 0 | Not used |

Domestic Font

Six Lines Per Inch

Table A represents the first and the second multi-bit binary words which are necessary to generate the small portion of segment 24 (FIG. 2) associated with a single character 21, when producing a domestic font having a line density of six lines per inch. As shown, each binary word obtained from font memory 92 is eighteen bits long. In order to generate a character in this particular domestic font, each character scan must be 40 bits, i.e., dots, long. The first font word is used in its unmodified, 18-bit form. The secont font word consists of the 18 bits, followed by the additional four-bit pattern 0110. This additional bit pattern is used, for example, to indicate a character underscore. In the alternative, a four-bit pattern 0000 indicates the lack of an underscore. In either event, the second font word is modified to a bit length of 22, thus giving the required 40-dot total for the character scan.

TABLE B

| 2nd Word | 1st Word |
|---|---|
| Bit 1′ | 0 |
| Bit 2′ | 0 |
| Bit 3′ | 0 |
| Bit 4′ | 0 |
| Bit 5′ | Bit 1 |
| Bit 6′ | Bit 2 |
| . | . |
| . | . |
| Bit 17′ | Bit 13 |
| Bit 18′ | Bit 14 |
| 0 | Bit 15 |
| 0 | Bit 16 |
| 0 | Bit 17 |
| 0 | Bit 18 |

Domestic Font

Five and One-Third Lines Per Inch

Table B represents the first and the second multi-bit binary words which are derived from font memory, and then modified, to provide the character scan necessary to generate a domestic font having a line density of five and one-third lines per inch. As shown, the font memory binary word is again 18 bits long. In order to generate a character in this particular domestic font, each character scan must be 44 bits, or dots long. The first 18-bit font word is always preceded by an added four-bit pattern 0000. This additional bit pattern provides a white or background accommodating the greater line spacing. The second 18-bit font word consists of the 18 bits, followed by an additional four-bit pattern 0000. As explained previously, this additional bit pattern, added to the second font word, is used to indicate the character underscore condition. In this case, the bit pattern 0000 indicates the lack of an underscore. The addition of a four-bit binary pattern to the beginning of the first font word and the end of the second font word gives the required 44 dot total for the character scan.

TABLE C

| Word |
|---|
| Bit 1 |
| Bit 2 |
| . |
| . |
| . |
| Bit 17 |
| Bit 18 |
| Not used |
| Not used |
| Not used |
| Not used |
| Rotated Font |

Table C represents the single 18-bit binary word which is derived from font memory and then used, without modification, to provide a character scan for a rotated font. The binary word obtained from font memory is always 18 bits long. No modification occurs, and the character scan associated with each rotated font character is 18 bits long.

As can be appreciated from Table A, B and C, the variable length binary word is variable between an 18-bit word (the first word of Table A and all rotated font words) and 22 bits (the second word of Table A and the first and second words of Table B). As mentioned previously, these variable length words may be stored in font memory 92, rather than resorting to the above-described modification technique.

Referring now to FIG. 5, the output of font memory 92 is presented as an 18-bit parallel word to word length modifying network 110. This network is controlled by conductor 76, that is, by the control bits contained within register 75 (FIG. 4) so as to modify the font memory word length in accordance with the selected font, as shown in exemplary fashion by Tables A, B and C. This font word, in either the unchanged 18-bit length or in the modified 22-bit length, is then stored in buffer register 111. FIG. 5 contains parenthetical legends indicating that while word X+1 resides in buffer register 111, word X+2 is the next word which will be entered in modifying network 110.

At the same time, word X resides in the eight shift registers identified as SR1–SR8, respectively. Each of these eight shift registers comprises a three-stage register whose data is read out in cyclic fashion fron the first stage thereof, under the control of read-clock 53, and whose data is sequentially shifted fron the second to the first stage and from the third to the second stage.

Figures 9, 15:
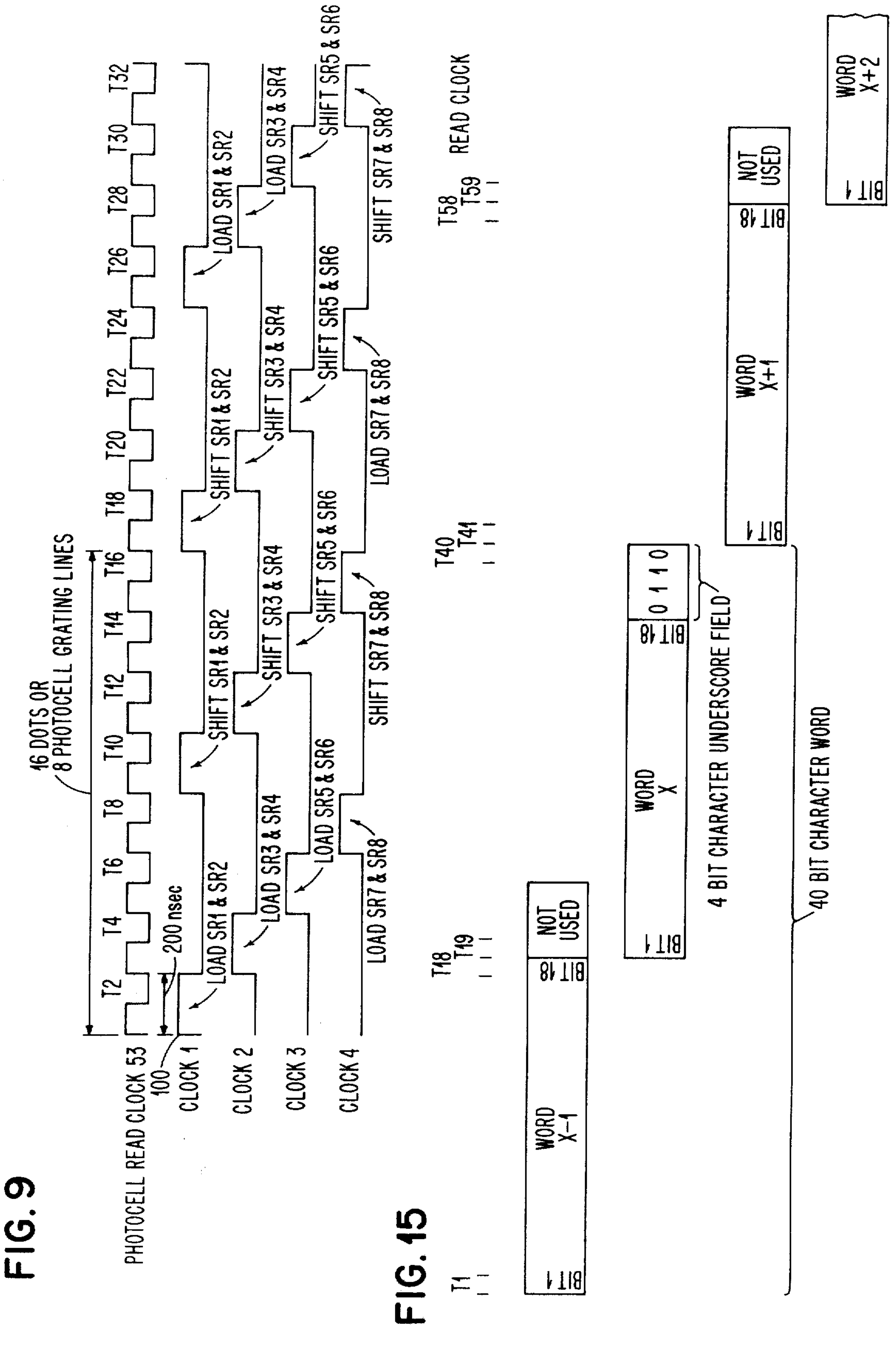
FIG. 9 is a waveform diagram showing the five clocking waveforms which are derived from the optical grating and photodetector of FIG. 1, which waveforms are used to control the readout, loading and shifting of the shift register shown in FIG. 5.
FIG. 15 depicts the cyclic readout of the first stages of the shift registers of FIG. 5, which results in a serial bit stream comprising words X−1, X, X+1, and X+2 of FIG. 14.

Loading and shifting of the vertical length binary words into shift registers SR1–SR8 is controlled by the output of photocell 52 (FIG. 1), that is, by read clock signal 53. This clocking operation can be best depicted by the example of FIG. 10, wherein the "read clock" comprises signal 53, and wherein "clock 1", "clock 2", "clock 3" and "clock 4" are provided by modulo-eight counters 112 (FIG. 5), these four counters being driven by signal 53 and providing four phase-displaced output waveforms as shown in FIG. 9.

FIG. 10 traces the read clock 53 (FIG. 9) through 30 timing intervals, i.e., 15 cycles. Each interval T comprises a relatively short time interval such as, for example, 100 nanoseconds. The five columns of FIG. 10 indicate the control action which occurs at shift registers SR1–SR8 during each timing interval and during each timing pulse of clocks 1, 2, 3 and 4 (FIG. 9). Note that the active timing pulse of each clock waveform is equal in time duration to one 200-nanosecond cycle of read clock 53.

FIG. 10 can be best understood by considering this figure with reference to FIGS. 11, 12, and 13. FIG. 11 is a diagrammatic showing of the eight shift registers, SR1 through SR8, at the end of time period T2. This figure shows the data content of these shift registers after bit 16 of word X-1 has been read from shift register SR6, and after all three stages of SR1 and SR2 have been loaded with the appropriate bits of the next word, i.e., word X. As depicted in FIG. 10, during time period T1, bit 15 of word X-1 is read. During time interval T2, bit 16 of this data word is read. During timing pulse 100 of clock 1, shift registers SR1 and SR2 are loaded with the appropriate bits of data word X, these bits carrying the prime notation.

In accordance with the teachings of the present invention, bit 1' is located in the first stage of register SR1. Since the number N of registers is equal to eight, the N+1 bit, i.e., bit 9', is loaded in the second stage of register 1, whereas the 2N+1 bit, bit 17', is loaded in the third stage of register SR1.

Correspondingly, bit 2' is loaded in the first stage of register SR2, bit N+2, or bit 10', is loaded in the second stage of this register, and bit 2N+2, or bit 18', is loaded in the third stage of this register.

As the read clock continues to progress from time interval T2 to time interval T8, the first stage of shift registers SR7 and SR8, and then SR1 through SR4, are read in timed progression, to thereby read out bits 17 and 18 of data word X—1, and to then readout bit 1' through bit 4' of data word X. Registers SR3, SR4, SR5, SR6, SR7 and SR8 are loaded with the appropriate bits of data word X until, at the end of time interval T8, the loading of word X has been completed.

FIG. 12 is a diagrammatic showing of the shift registers at the end of time period T8, showing the data content after bit 4' of word X has been read out from the first stage of shift register SR4, and after loading of the 22-bit word X has been completed. With reference to this figure, it can be seen that the first stage of a particular register has been loaded with a given bit-position of word X, whereas the second stage of this register has been loaded with that bit-position increase by the quantity N, in this case 8, and the third stage of this register has been loaded with the bit-position 2N greater than the bit-position which was loaded in the first stage. Since word X is assumed to be a 22-bit word, the third stage of register SR6 receives bit-position 22. The loading of registers SR7 and SR8 does not provide significant data in the third stages thereof.

As the read clock cycle continues, the first stages of the shift registers continue to be read in cyclic fashion. In addition, shift registers SR1 and SR2 are shifted by clock 1; shift registers SR3 and SR4 are shifted by clock 2; shift registers SR5 and SR6 are shifted by clock 3; and shift registers SR7 and SR8 are shifted by clock 4. At the end of time T16, all registers have experienced one shift cycle. During the time period T17–T24, shift registers SR1 through SR6 experience a second shift cycle, and shift registers SR7 and SR8 experience a load cycle. During this second shift cycle, the first and second bits and the corresponding bits N+1, N+2, 2N+1 and 2N+2, of word X+1 are loaded into shift registers SR7 and SR8.

FIG. 13 is a diagrammatic showing of the shift registers at the end of time period T24. This figure shows the data content after shift registers SR1 through SR6 have been shifted twice (from the state shown in FIG. 12), and after shift registers SR7 and SR8 have been shifted once and then loaded with the appropriate double-prime bits of data word X+1. At the end of time period T24, the reading of bit 20′, data word X (the first stage of SR4) has been completed.

In accordance with the present invention, shift register SR7 was identified as the location for the load of the first, the 9th, and the 17th bit of word X+1 in accordance with a machine-implemented algorithm which performs calculations based upon knowledge of the bit-length of word X and the shift register into which its first bit was loaded. More specifically, this algorithm requires that the bit length of the previous word X (22 bits) be divided by the total number N of shift registers (8) in order to derive a remainder (6), whereupon this remainder is added to the numerical identification of the shift register which receives the first bit of word X (SR1 as shown in FIG. 11), in order to thereby identify the shift register (SR7) whose first stage will receive the first bit-position of word X+1. For the case in which the summation of the remainder and the pointer is greater than N, a second division by N is performed. In this case, the remainder which results from this second division is the new pointer.

FIG. 5 shows an equivalent machine-implementation of an algorithm which requires that the bit length of the word X (22 bits) be added to the previously calculated pointer value for word X (SR1), and wherein the sum (23) is divided by the total number N of shift registers (8) in order to derive a remainder (7) which identifies the shift register (SR7) whose first stage will receive the first bit-position of word (X+1).

In both cases, the quotient of such division functions to control the load-shift cycles shown in FIG. 10. More specifically, the quotient indicates the number of shift cycles for word X which is necessary prior to enabling load cycles for word X+1.

The foregoing description, which describes in detail the cyclic readout, loading and shifting of shift registers SR1–SR8, results in the sequential conversion of parallel binary words, of variable bit length, into N-bit (8) binary words which are cyclically converted into an uninterrupted serial bit stream at output 46.

FIG. 14 depicts two 40-bit font memory words which are successively loaded into the shift registers in four load cycles. During the first load cycle, 18-bit word X−1 is loaded into the shift registers. Readout of this word, in serial bit fashion, progresses as depicted in FIG. 15. During the readout of the bits of word X−1, the loading of the 22-bit word X (FIG. 14) occurs. At the end of time T18 (FIG. 15), readout of word X−1 has been completed. During time interval T19, the first bit of word X is read out. Readout of word X continues and, as above described, loading of word X+1 (FIG. 14) occurs during this readout. At time T40 (FIG. 15) the last bit of word X has been read out. At this time, a 40-bit character word has been completely read and modulator 38 has been controlled accordingly.

In accordance with Table A, the 40-bit character word represented by words X−1 and X defines a character in domestic font having a line spacing of six lines per inch. The bit pattern 0110 represented by bits 19–22 of word X indicates that this character is to be underscored.

Referring again to FIG. 15, the first bit of word X+1 is read out during time interval T41. Readout of word X+1 continues until at the end of time T58 the last bit, bit 18, of word X+1 has been read and readout of word X+2 begins. The domestic font character represented by words X+1 and X+2 is a character having no underscore, as defined by bits 19–22 of word X+2.

Referring again to FIG. 5, the bit length of word X is entered into register 114 and presented as a first input to adder 115, by way of conductor 116. The information contained on conductor 116 is that word X is 22 bits long (see FIGS. 14 and 15).

A previous logical calculation on word X−1 has identified shift register SR1 as that shift register which will receive the first data bit, and the appropriate subsequent data bits, of word X. This load pointer information is provided as output 117 by pointer register 140 and the numerical identification of this shift register, namely, "SR1" is added to the information on conductor 116, to originate output 119 from adder 115, indicating the sum of "23".

This signal, namely, "23", is divided by eight by division network 120. The quotient of this division, namely, "2", is presented as an output on conductor 121; whereas the remainder of this division, namely, "7", is presented as a second output on conductor 122.

Pointer generator network 118, FIG. 5, which comprises a portion of the load control means, is operative to provide a pointer for word X+1, on output conductor 123, identifying shift register SR7 as the shift register which will receive the first bit and the appropriate subsequent bits of word X+1.

The quotient output of this division is stored in down counter 124. Thus, counter 124 will count down from a value of "2" under the control of clock 3, this clock input being provided by conductor 125. With reference to FIG. 10, it can be seen that counter 124 will count down from "2" to "1" at time T6, and will count down from "1" to "0" at time T14. Network 126 is provided to test the contents of counter 124. When the contents of this counter are 0, output conductor 127 becomes active and ring counter 128 is enabled. Thus, counter 128 is enabled at time T22. Ring counter 128 is shown in detail in FIG. 8. This ring counter comprises a load/-shift control means and functions to control shift registers SR1–SR8 so as to produce the load-shift functions shown in FIG. 10.

Figures 6, 8:
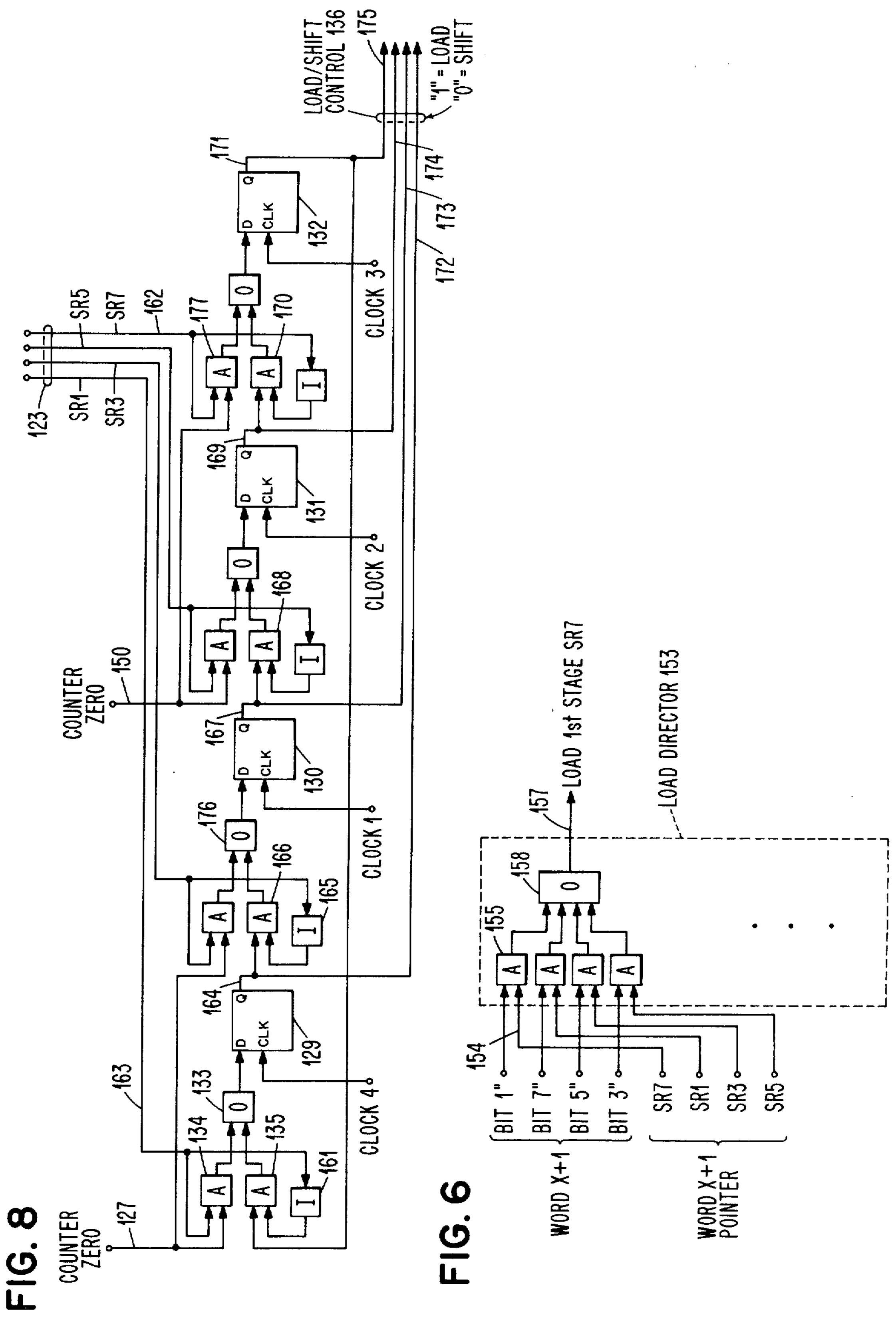
FIG. 6 is a detailed showing of one of the twenty-four, i.e. MxN, logic networks contained in FIG. 5's load director, the specific logic network shown being the network which directs the loading of the first stage of shift register SR7.
FIG. 8 is a more detailed showing of FIG. 5's ring counter.

A second enable signal, whose function will be apparent from a description of FIG. 8, is provided by the output of delay network 152, on conductor 150. This delayed enable signal is delayed four time periods relative to the enable signal on conductor 127, as determined by the clock 1 input on conductor 151.

Considering the load cycle for word X+1, which begins at times T23 and T24, as shown in FIG. 10, the specific bits of word X+1, which are loaded out of buffer register 111 into shift registers SR1–SR8, are loaded under the control of load director network 153. This load director network is operable to direct the loading of the first bit of word X+1 into the first stage of shift register SR7, as shown in FIG. 13. In addition, the ninth bit of word X+1 is loaded into the second stage of shift register SR7, and bit seventeen is loaded into the third stage of this shift register. As previously explained, the loading of shift registers SR7, SR8, SR1, SR2, SR3, SR4, SR5 and SR6 proceeds in timed progression through time intervals T23–T30, as shown in FIG. 10.

With reference to FIG. 6, this figure discloses one of the twenty-four logic networks comprising the load director. Each of the twenty-four logic networks is associated with a unique one of the twenty-four shift register stages. The particular network shown in FIG. 6 is that network associated with the first stage 159 of shift register SR7 (see FIG. 7). As previously explained, the word X+1 load pointer, on conductor 123 (FIG. 5), points to shift register SR7. Thus, conductor 154 enables AND 155. The first bit, namely bit 1″, of word X+1 is present on conductor 156, and this bit, be it a binary 1 or a binary 0, is loaded into the first stage of shift register SR7, by way of conductor 157 and OR 158.

FIG. 7 depicts this bit loaded into the first stage 159 of shift register SR7.

The twenty-three remaining load director logic networks are identical to the network shown in FIG. 6, with the exception that the AND inputs are such as to provide proper loading. For example, the load director logic network associated with the first stage 160 of shift register SR8 is identical to the network shown in FIG. 6, wherein the four AND gates are provided with bits 4″, 6″, 8″ and 2″ of word X+1. With pointer SR7 being active, bit 2″ passes through the corresponding OR gate and is loaded into the first stage of shift register SR8.

In a corresponding manner, succeeding bits of word X+1 are loaded into the first stage of all of the shift registers, and, in a similar manner, the second and third stage of the shift registers are loaded, under the control of load director 153, until all bits of word X+1 have been loaded. As can be seen from FIG. 10, this loading is complete at the end of time period T30.

Referring to FIG. 8, ring counter 128 is shown as comprising four D-type latches 129–132. Each of these latches is provided with a clock input, connected respectively to clock 4, 1, 2 and 3 outputs of the modulo eight counters of FIG. 5. In addition, each of these latches is controlled by one of the unique pointers SR1, SR3, SR5 or SR7 which are generated by pointer generator 118 at output conductor 123. As will be appreciated, since in the exemplary description of the present invention the variable word length contained in buffer register 111 is always even, that is, either 18 bits long or 22 bits long, and since loading always begins at shift register SR1, the only necessary pointers are those for shift registers SR1, SR3, SR5, or SR7. These pointers control latches 129, 130, 131, and 132, respectively. In addition, the enable lines 127 and 150 of FIG. 5 enable operation of ring counter 128. More specifically, enable line 127 controls operation of latches 129 and 130, whereas enable line 150 controls operation of latches 131 and 132. The D input of latch 129 receives its control signal from OR 133, as this gate is controlled by AND's 134 and 135. Specifically, AND 134 is enabled if pointer generator 118 has generated a pointer to shift register SR1 and if counter 124 is in a zero condition. AND 135 is enabled if the Q output of latch 132 is active (a binary 1) and a pointer other than SR1 is generated. This latter function is accomplished by inverter 161.

The output 136 (FIG. 5) of ring counter 128 controls the load/shift of shift registers SR1–SR8, as shown in FIG. 10. With reference to FIG. 8, the Q outputs of latches 129–132 constitute the load/shift control of the shift registers, as shown in FIG. 10. When W is active, or a binary 1, the output constitutes a load command. When Q is inactive, or a binary 0, the output constitutes a shift command. Thus, it can be seen that, with reference to FIG. 10, the shifting of the registers will continue from time T9–T22, whereupon the SR7 pointer portion 162 of conductor 123 is operative to control latch 132 in a manner to cause ring counter 128 to generate four active Q outputs, these outputs comprising the four load outputs. These outputs are derived in sequence from the Q outputs of latches 132, 129, 130 and 131. Thus, word X+1 is loaded from time T22 through time T30.

In a similar manner, it can be shown that the pointer to be generated for word X+2 (FIG. 14) would indicate that since word X+1 is 18 bits long, and since the load pointer for word X+1 is SR7, the quotient output 121 of network 120 would be "3" and the remainder output "1" would point to shift register 1 as the load point for word X+2.

Shift registers SR1–SR8 are of the type well known to those skilled in the art, having both a shift/load input and a clock input, such that loading and shifting of data is gate-controlled, under the control of input conductors 136, and readout of the first stages of these shift registers is also gate controlled, under the control of read clock 53, this latter function being diagrammatically shown as at 141.

Considering the operation of the ring counter shown in FIG. 8, it will be assumed that pointer generator network 118 (FIG. 5) has rendered SR1 pointer conductor 163 active to partially enable AND 134. It will further be assumed that down counter 124 (FIG. 5) contains a zero, after haaving been counted down by clock 3. Thus, conductor 127 is active, to complete the enabling of AND 134. An active signal, i.e. a binary 1, now propagates through OR 133, causing the Q output 164 of latch 129 to become active during the cycle of clock 4 which immediately procedes time period T1 shown in FIG. 9. As a result, the conductor 172, of load/shift control 136, is operable to provide an active signal (a binary 1) to the shift/load gates of shift registers SR1 and SR2, thus conditioning these shift registers for a load cycle. The clock input gates of shift registers SR1 and SR2 are controlled by clock 1. Thus, during time interval T1–T2 (see FIG. 9) shift registers SR1 and SR2 are loaded with the appropriate bits of word X (see FIG. 10).

In addition, the active signal on conductor 164 propagates through AND 166 (note that the output of inverter 165 is active) and OR 176 such that during the T1–T2 clock 1 cycle, the Q output 167 of latch 130 provides an active output on the conductor portion 173 of load/shift control 136. Conductor 173, when active (a binary 1), is operable to control the shift/load gates of shift registers SR3 and SR4, conditioning these gates for a load operation. The clock input gates of shift registers SR3 and SR4 are controlled by clock 2, such that clock 2 is operable during its T3–T4 cycle to effect the loading of the proper bits of word X into shift registers SR3 and SR4. In like manner, latches 131 and 132 are controlled by clocks 2 and 3 to effect active output signals (binary 1's) on conductors 174 and 175, respectively, of load/shift control 136. These conductors control the loading of shift registers SR5–SR6 and SR7–SR8, respectively, to enable the loading of the proper bits of word X, such that at the end of time period T8, word X is completely loaded, as shown in FIG. 12.

At the end of time T8, conductor 171 is active and operates to partially enable AND 135. Since the SR1 pointer conductor 163 is active at this time, the output of inverter 161 maintains AND 135 inhibited. Additionally, the calculation of the pointer for word X+1 (SR7) has placed a count in down counter 124 (FIG. 5) such that conductor 127 is now inactive, inhibiting AND 134. As a result, the output of OR 133 is inactive, or a binary 0. Thus, during the T7–T8 cycle of clock 4, the Q output 164 of latch 129 changes from an active to an inactive state. The binary 0 which now appears on conductor 172 controls the shift/load gates of shift registers SR1 and SR2 such that these registers will be shifted, rather than loaded, during the T9–T10 cycle of clock 1. In a similar manner, an inactive signal (binary 0) propagates through conductors 173, 174 and 175 of load/shift control 136 such that the shift/load gates of shift registers SR3–SR4, SR5–SR6 and SR7–SR8, respectively, are shifted by clock 2, clock 3 and clock 4, respectively, during the time interval T11–T16.

The Q output 171 of latch 132 is rendered inactive during the T13—T14 cycle of clock 3. Thus, during the T15–T16 cycle of clock 4, AND 135 is inhibited. While the counter testing network 126 (FIG. 5) now provides an active signal on conductor 127 (remembering that down counter 124 was reduced to "zero" by the T13–T14 cycle of clock 3), pointer generator circuit 118 (FIG. 5) has generated an SR7 pointer for word X+1, and conductor 163 is therefore inactive. As a result, the T15–T16 cycle of clock 4 operates to generate a second inactive signal on conductor 172. This inactive signal operates to provide the T17–T18 shift cycle for shift registers SR1 and SR2 (see FIG. 10).

In a similar manner, inactive signals again propagate through latches 130 and 131, thus providing the proper shift control of shift registers SR3–SR4 and SR5–SR6 during the T19–T20 and T21–T22 cycles of clock 2 and clock 3, respectively, as defined by FIG. 10.

Considering now the four time period delay network 152 of FIG. 5, this network received an active signal from the output of the counter testing network 126 at the end of time period T14, when clock 3 had reduced the content of down counter 124 to "zero". During the next cycle of clock 1, namely the T17–T18 cycle, network 152 receives an active signal on conductor 151, and as a result thereof, generates a delayed enable signal on conductor 150.

At the beginning of time T21, AND 177 (FIG. 8) is enabled by an active signal on conductor 150 and an active signal on conductor 162, this latter signal defining the SR7 pointer portion for word X+1. As a result, during the T21–T22 portion of the clock 3's cycle, the Q output 171 of latch 132 becomes active. Load/shift control 136 of conductor 175 now changes from a binary 0 to a binary 1. As a result, the shift/load gates of shift registers SR7 and SR8 are conditioned to perform a load operation during the T23–T24 cycle of clock 4. In this manner, the appropriate bits of word X+1 are loaded into the stages of shift registers SR7 and SR8, as shown in FIG. 13.

During the T23–T24 cycle of clock 4, an active output now appears from OR 133 (by way of AND 135) and, as a result, an active output propagates through conductors 172, 173 and 174, in timed progression, to effect loading of shift registers SR1–SR2, SR3–SR4 and SR5–SR6 during the clock cycles of clocks 1, 2 and 3, respectively, as defined by FIG. 10 during the time interval T25–T30.

In this manner, ring counter 128 (FIG. 5) operates to control the loading and shifting of the shift registers, under the control of the shift register pointer output 123 derived from pointer generator 118, and under the control of the clock 1-clock 4 inputs derived from the modulo-eight counters 112. The transition between load and shift cycles is controlled by a zero count within down counter 124, as this counter is decremented by clock 3, it being noted that two enable signals 127, 150 are provided to ring counter 128, the latter of these enable signals being a delayed enable signal controlled by clock 1.

While the invention has been particularly shown and described with reference to a preferred embodiment thereof, it will be understood by those skilled in the art that various changes in form and detail may be made therein without departing from the spirit and scope of the invention.

What is claimed is:

1. Printer apparatus for generating an image of a page, bearing rows of characters, on an image receiving member by means of a binary image generating means which successively scans said image receiving member in raster fashion to thereby generate columnar segments, each of said columnar segments being generated by a plurality of variable-length binary words which are uniquely related to the character content of said page and to a selected font, the improvement comprising:

page memory means capable of storing a plurality of character identifying codes in accordance with the character content of said page;

font memory means capable of storing a plurality of binary words which define possible characters in the character content of said page, the bit-length of said binary words being variable;

a plurality N of shift registers, each having a plurality M of data storage stages;

readout control means operable to continuously control said binary image generating means in closed loop read cycles in accordance with the binary content of the first stage of each of said registers in a recycling read-order;

load control means operable to sequentially control the loading of said shift registers from said font memory means, one binary word at a time;

said load control means being operable to load the first bit of word X in the first stage of one of said shift registers, the N+1 bit in the second stage of said one shift register, and so on progressively;

being operable to load the shift register whose first stage is next in said read-order with the second bit of word X, the 2N+1 bit in its second stage, and so on progressively; and being operable to load the remaining shift registers in a similar manner until word X has been loaded into said shift registers, with the first stages of all shift registers having been loaded in progression with bits 1 through N in the said read-order;

clock means;

load/shift control means controlled by said clock means and operable to selectively shift or load said shift registers at times other than the time during which the first stage is being read; and pointer means controlling said load/shift control means such that the loading of the first bit of word X+1 is loaded into the next adjacent shift register to that shift register which received the last bit of word X.

2. Printer apparatus as defined in claim 1 wherein said clock means is derived from the scan by said image generating means.

3. Printer apparatus as defined in claim 2 wherein said pointer means includes:

means for storing a numerical identification of the shift register whose first stage was loaded with the first bit of word X−1;

means for comparing the bit-length of word X−1 to the quantity N; and means controlled by said comparing means for deriving an output numerical pointer identifying the shift register whose first stage is to receive the first bit of word X.

4. Printer apparatus as defined in claim 3 including:

counter means for counting said successive N-bit read cycles; and means connecting said counter means in controlling relation to said load/shift means.

5. Printer apparatus as defined in claim 4 wherein said variable length font memory means binary words have a minimum length of N bits.

6. Printer apparatus as defined in claim 5 wherein said font memory means includes:

a font memory capable of storing a plurality of binary words of fixed which define the possible characters in the character content of said page; and word modifying means controlled in accordance with the selected font to selectively modify the length of said fixed length binary words to said variable length in accordance with the selected font.

7. A bit stream generator for receiving successive data words containing a variable number of parallel data bits, and for delivering the data bits of successive words as a continuous serial bit stream, comprising:

a plurality N of shift registers, each having a plurality M of data storage stages;

data readout means for continuously sequentially addressing said first register stages in successive read cycles in an invariable closed loop read-order;

clock means for timing the sequential addressing of said data readout means;

load control means for loading the first bit of data word X in the first stage of one of said shift registers, the N+1 bit in the second stage of said one shift register, and so on progressively;

for loading the shift register whose first stage is next in said read-order with the second bit of data word X in its first stage, the N+2 bit in its second stage, and so on progressively;

and for loading the remaining shift registers in a similar manner until the data word has been loaded into said shift registers with the first stages of all shift registers having been loaded in progression with bits 1 through N of the data word;

shift/load control means responsive to said clock means for selectively shifting or loading each of said shift registers at times other than the time the first stage of the shift register is being addressed by said data readout means;

logic means for determining the number of bits in data word X, as this number compares to the quantity N;

means for storing a numerical identification of the shift register whose first stage was loaded with the first bit of data word X;

load logic means for comparing the comparison made by said logic means to said numerical identification to derive a load pointer identification of the shift register into which the first bit of data word X+1 is to be loaded; and means controlled by said load pointer and connected to said load control means for loading data bits into the stages of said shift registers as identified by load pointer.

8. A bit stream generator as defined in claim 7 wherein said successive data words having a minimum bit of length of N.

9. A bit stream generator as defined in claim 8 wherein said logic means divides the number of bits in data word X by N, including:

means for storing a numerical indication of the quotient resulting from said division;

means for modifying the value of said quotient when said quotient is greater than N;

counter means for counting said successive N-bit read cycles; and means connecting said numerical indication of the quotient and said counter means in controlling relation to said shift/load means.

* * * * *

UNITED STATES PATENT OFFICE

CERTIFICATE OF CORRECTION

PATENT NO. : 3,898,627

DATED : August 5, 1975

INVENTOR(S) : Robert W. Hooker and Robert R. Schomburg

It is certified that error appears in the above-identified patent and that said Letters Patent are hereby corrected as shown below:

Column 1, line 53, "form" should read --from--.

Column 2, line 22, after "first" insert --type--;

line 66, "work" should read --word--.

Column 6, line 19, "other" should read --order--.

Column 9, line 51, "fron" should read --from--;

line 52, "vertical" should read --variable--.

Column 10, line 20, "located" should read --loaded--.

Column 14, line 2, "W" should read --Q--;

line 35, "haaving" should read --having--;

line 40, "procedes" should read --precedes--.

Column 18, line 35, after "bit", delete "of".

Signed and Sealed this

*second* Day of *December 1975*

[SEAL]

*Attest:*

RUTH C. MASON
*Attesting Officer*

C. MARSHALL DANN
*Commissioner of Patents and Trademarks*